C. L. GERRARD.
APPARATUS FOR TREATING GAS ELECTRICALLY.
APPLICATION FILED MAR. 4, 1907.

968,145.

Patented Aug. 23, 1910.

Witnesses:
Irving Macdonald
McClelland Young

Inventor:
Clarence L. Gerrard
By Barton, Tanner & Falk
Attys.

UNITED STATES PATENT OFFICE.

CLARENCE L. GERRARD, OF COLUMBUS, NEBRASKA.

APPARATUS FOR TREATING GAS ELECTRICALLY.

968,145.

Specification of Letters Patent. Patented Aug. 23, 1910.

Application filed March 4, 1907. Serial No. 360,399.

*To all whom it may concern:*

Be it known that I, CLARENCE L. GERRARD, citizen of the United States, residing at Columbus, in the county of Platte and State of Nebraska, have invented a certain new and useful Improvement in Apparatus for Treating Gas Electrically, of which the following is a full, clear, concise, and exact description.

My invention relates to apparatus for treating gas or gaseous compounds electrically, and its object is to provide means by which the gas is thoroughly and efficiently subjected to the action of an electric discharge or discharges.

My invention consists of apparatus by which an electric discharge is moved through the gas or gaseous medium which is to be operated upon.

More specifically my invention contemplates a structure in which positive and negative electric terminals are adapted to be held in such relation to each other as to produce and maintain an arc or sparkling discharge, and while so held are moved through the medium to be subjected to the electric discharge. By such arrangement, approximately the whole of the gaseous body is brought into immediate proximity to the electric discharge. Moreover, by continuously moving the terminals, the discharge acts upon any particular portion of the gaseous body only so long as is necessary and desirable to synthetically combine the gas or gaseous mixture, hence there is no waste of electrical energy.

A further feature of my invention consists in the provision of means by which a gas or gaseous mixture may be compressed at the time it is being brought into intimate contact with the electric discharge.

While my invention is obviously applicable to the treatment of gases or gaseous compounds in general, it is especially well adapted to the synthetical production of the oxids of nitrogen from atmospheric air.

Figure 1:
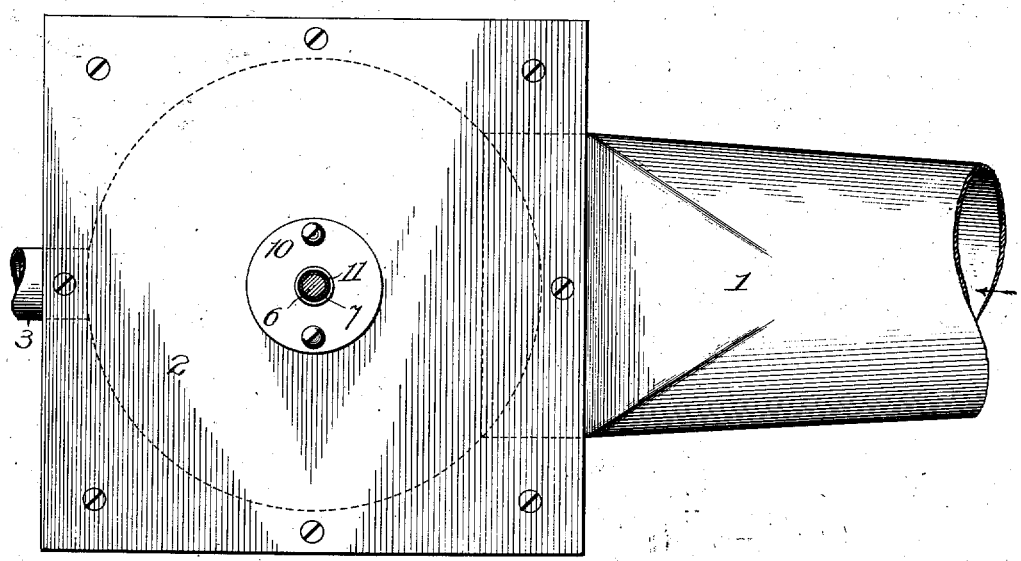
Figure 2:
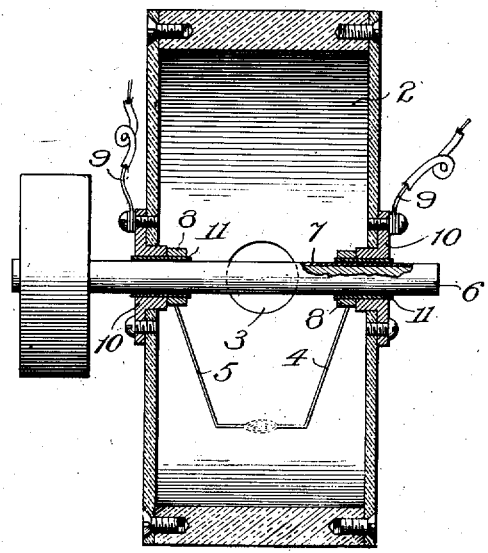

Referring to the drawing Figure 1 is a side elevation of my improved apparatus; and Fig. 2 is a vertical cross-section thereof.

Like parts are designated by similar characters of reference throughout both figures.

The air or other gaseous body to be subjected to treatment passes from the usual blower or fan through a pipe 1 into a chamber 2, which has an outlet 3 through which the gases are carried off after treatment. As is well known, it is in some cases desirable that the gas under treatment as, for example, atmospheric air, which is to be converted into the oxids of nitrogen, be under compression while being subjected to the electric discharge. For that reason, I prefer to make the outlet 3 smaller than the inlet pipe 1, so that the gases in the chamber 2 are placed under more or less pressure. The walls of the chamber 2 may be made of some material which will resist the chemical action of the compounds formed. I preferably construct said walls out of glazed porcelain, molded lava or similar acid resisting material.

In carrying out my invention, I mount terminals 4 and 5 in pairs in such manner that they may all be moved and thereby carry the electric arc through the gaseous body inclosed within the chamber 2. The arc is thus brought in such relation with the gas under treatment that for a given expenditure of electrical energy, a comparatively large quantity of gas is brought into contact with the electric discharge. For convenience of illustration, I have shown only a single pair of terminals, it being understood, of course, that such pairs may be duplicated, if desirable, and connected in circuit in any usual manner.

Referring more particularly to Fig. 2, a shaft 6 is shown as extending through the chamber 2 and journaled in the side walls thereof. Said shaft may have a covering 7 of acid resisting material which may also serve to insulate it electrically. Said shaft may be provided with metallic collars 8, 8, on which are mounted the terminals 4, 5, respectively, said collar and terminals revolving with the shaft. While I have shown said terminals so arranged that the arc formed between them extends in a direction parallel to the length of the shaft 6, I wish it understood that I do not limit myself to any particular relative arrangement of the direction of said discharge with relation to the shaft which forms its center of revolution. Conductors 9, 9 connected to a source of current are secured to metallic collars 10, 10 which contact with the collars 8, 8 respectively. Said collars 10, 10 are secured about the openings in the walls of the chamber 2 through which the shaft 6 extends and form journals for said shaft. Sleeves 11, 11 of conducting material may be placed around the shaft 6 to further electrically connect the collars 8, 10. The shaft 6 may be driven in any suitable manner.

It is obvious that the relative position of the terminals 4, 5 to each other, the manner in which they are mounted to have motion through the space within the chamber, and the method in which they are connected in circuit may be modified without departing from my invention.

I claim:—

1. In an apparatus for producing gas reactions, a chamber for inclosing the gas or gases, said chamber having an outlet and an inlet, said outlet being smaller than said inlet, a rotary shaft projecting into said chamber, and positive and negative terminals mounted upon said shaft and arranged to rotate therewith.

2. In apparatus for producing gas reactions, a chamber for inclosing the gas or gases, said chamber having an inlet and an outlet through which the gas passes continuously into and out of said chamber, a rotary shaft projecting into said chamber, and positive and negative electric terminals mounted upon said shaft and arranged to rotate therewith to produce a rotating arc discharge within said chamber.

In witness whereof, I hereunto subscribe my name this 28th day of Feb. A. D., 1907.

CLARENCE L. GERRARD.

Witnesses:
V. H. WEAVER,
EILERT MOHLMANN.